No. 760,039. PATENTED MAY 17, 1904.
J. SZCZEPANIK.
PROCESS OF PRODUCTION OF ENDLESS CARDS FOR WEAVING PURPOSES.
APPLICATION FILED FEB. 28, 1901.
NO MODEL.
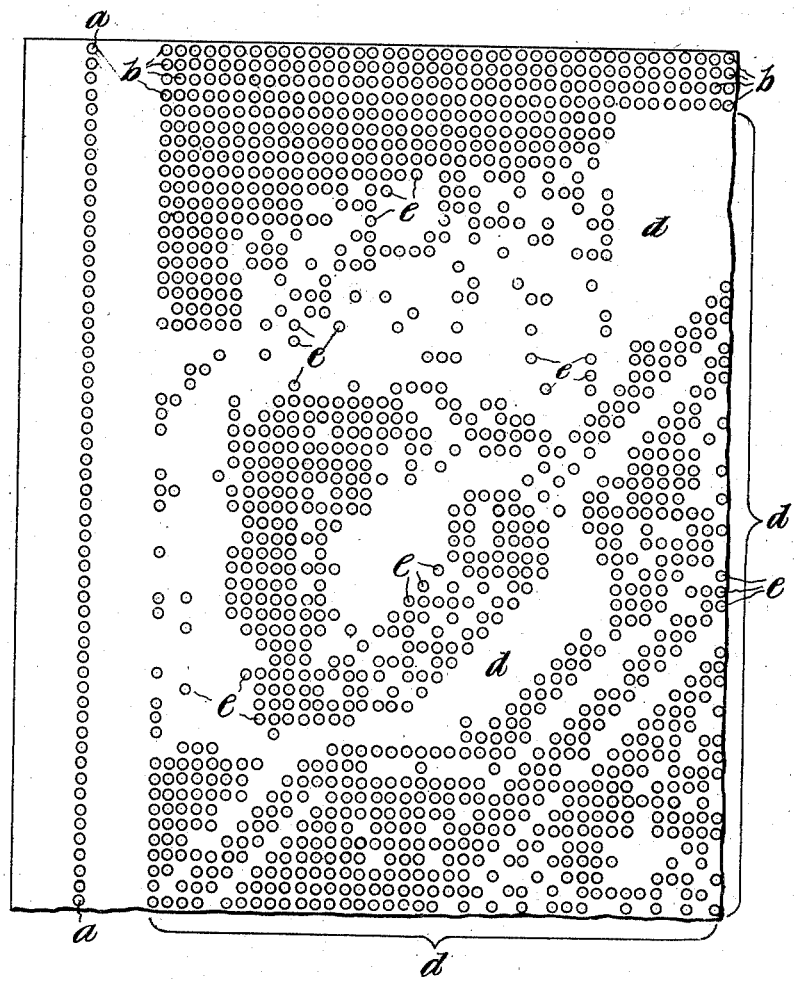

No. 760,039. Patented May 17, 1904.

UNITED STATES PATENT OFFICE.

JAN SZCZEPANIK, OF VIENNA, AUSTRIA-HUNGARY, ASSIGNOR TO SOCIÉTÉ DES INVENTIONS JAN SZCZEPANIK & CO., OF VIENNA, AUSTRIA-HUNGARY, A FIRM.

PROCESS OF PRODUCTION OF ENDLESS CARDS FOR WEAVING PURPOSES.

SPECIFICATION forming part of Letters Patent No. 760,039, dated May 17, 1904.

Application filed February 28, 1901. Serial No. 49,348. (No specimens.)

*To all whom it may concern:*

Be it known that I, JAN SZCZEPANIK, a subject of the Emperor of Austria-Hungary, residing at Vienna, in the Province of Lower Austria, in the Empire of Austria-Hungary, have invented certain new and useful Improvements in Processes of Production of Endless Cards for Weaving Purposes; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

This invention has for its object to substitute for the hitherto usual jacquard-cards a card made as an endless strip which can be produced by photochemical means. To produce such an endless card, the use of which requires only that the lifting wires or needles of the jacquard be arranged in a single row, as is the case, for example, in a dobby, a diagram is required in which each weft-thread and each warp-thread is separately represented as they are to be punched in the jacquard-card by a horizontal row and a vertical row of fields or portions of the diagram, respectively, and the thread-crossings are advantageously shown by round dots. Such a diagram is shown in the accompanying drawing. Each horizontal row of dots represents the thread-crossing for the corresponding weft-thread (or pick) and each vertical row the thread-crossing for the corresponding warp-thread. It will further be noted that in this diagram there are no squares, as there are in ordinary diagrams. At each of the two sides of the diagram there is an uninterrupted row of dots *a* or two such rows corresponding to those holes (corresponding to the registering holes in jacquard-cards) that are to be produced in the endless card to serve as guides for the same on the card-cylinder. Now for the production of an endless card by photochemical means according to the present invention such a diagram is copied in a copying-frame or projected in a photographic apparatus upon a plate of any desired or suitable metal, prepared, for example, with chromated fish-glue. The plate—for example, a zinc plate—is then developed, whereby free places and covered places are produced thereupon, of which the former correspond to the dots on the diagram. The plate is thereupon coated on the other side with an insulating or protecting layer of asphalt, leather, paper, or the like and is etched until round openings are formed in those parts of the plate which have been previously attacked by the light. Finally, the insulating layer, which insures that the etching takes place only from one side and that the plate is attacked only at this side, is stripped off in water. In order to make the card produced in this manner endless, the plate is initially provided on one of its ends with an extension in which several uninterrupted rows of holes *b* are produced by etching, to effect which the diagram likewise has an extension with uninterrupted rows of dots represented thereupon. The other end of the card is then laid upon this extension and is sewed thereto, whereby no holes *e* in the operative portion *d* of the card are covered or obturated, since there are no places in the extensions with pattern-holes omitted therein, and consequently no interruption in the pattern of the card can arise through the stitching together of the two ends. In the production of such endless cards all photographic methods can of course be used that are employed in the production of clichés. For example, a copy can be made directly on a layer of chromated fish-glue, or a copy can be made on pigment-paper and be thereupon transferred to the plate, or the plate can be coated with a halogen-silver emulsion and the unexposed parts washed off, &c. The etching of the plate can likewise be effected by chemical means or with the aid of a galvanic current. If such a card is to be used for a considerable time or repeatedly, it is covered with a layer of copper by galvanoplastic means, and its durability is thereby increased.

I claim—

1. The process of producing jacquard-cards, which consists in coating a metallic plate with a suitable film, producing upon that film an actinic impression of a series of spots arranged in the order of a weaving design, each thread-crossing of which is designated by one of said spots, developing the film, backing the plate with an acid-resist, etching entirely through the whole thickness of the plate and removing the film, substantially as set forth.

2. The process of producing jacquard-cards, which consists in coating a metallic plate with a suitable film, producing upon that film an actinic impression of the design, each thread-crossing represented by a round spot, and one or more series of round guide-spots at the sides of the design, developing the film, backing the plate with an acid-resist, etching entirely through the whole thickness of the plate with a suitable acid and removing the film, substantially as set forth.

3. The process of producing jacquard-cards, which consists in coating a metallic plate with a suitable film, producing upon that film an actinic impression of the design, each thread-crossing represented by a round spot, a series of round guide-spots at the sides and one or more series of round spots at one end, said series at the end uninterrupted, developing the film, backing the plate with an acid-resist, etching entirely through the whole thickness of the plate, removing the remaining film, overlapping and uniting the ends of the plate, holes of the series at one end being capable of registering with those in the design at the other end of the plate, substantially as set forth.

4. The process of producing jacquard-cards, which consists in coating a thin metallic plate with chromated glue, producing upon the film an actinic impression of a weaving design whose thread-crossings are represented by round spots, developing the film to remove said spots, backing the plate with an acid-resist, etching entirely through the whole thickness of the plate with a suitable acid, removing the coating on the plate, electroplating it with another metal and uniting the ends of the plate, substantially as set forth.

In testimony that I claim the foregoing as my invention I have signed my name in presence of two subscribing witnesses.

JAN SZCZEPANIK.

Witnesses:
A. FUNK,
ALVESTO S. HOGUE.